United States Patent [19]
Sakai et al.

[11] 4,367,394
[45] Jan. 4, 1983

[54] COATED ELECTRODE FOR ARC WELDING

[75] Inventors: Yoshiya Sakai, Fujisawa; Shigeo Nagaoka, Kamakura; Yohji Nakai; Takatoshi Tomoyasu, both of Fujisawa, all of Japan

[73] Assignee: Kabushiki Kaisha Kobe Seiko Sho, Kobe, Japan

[21] Appl. No.: 240,973

[22] Filed: Mar. 5, 1981

[30] Foreign Application Priority Data

Mar. 5, 1980 [JP] Japan ................................ 55-28435

[51] Int. Cl.$^3$ ..................... B23K 35/30; B23K 35/362
[52] U.S. Cl. .................................. 219/146.24; 148/24; 148/26; 219/145.23; 428/386
[58] Field of Search ....................... 219/145.23, 146.24; 427/59, 61; 428/385, 386, 387; 148/24, 26

[56] References Cited

U.S. PATENT DOCUMENTS 3,211,591 10/1965 Miltschitzky et al. ................ 148/26
3,393,102  7/1968 Carroll ................................... 148/26
3,490,942  1/1970 Lalieu ................................ 148/24 X

FOREIGN PATENT DOCUMENTS 50-10741  4/1975 Japan ............................. 219/146.24
52-39544  3/1977 Japan ............................. 219/145.23
54-135640 10/1979 Japan ............................. 219/146.24

Primary Examiner—R. R. Kucia
Attorney, Agent, or Firm—Oblon, Fisher, Spivak, McClelland & Maier

[57] ABSTRACT

A coated electrode for arc welding, comprising a steel wire core having a flux coating therein, the flux consisting essentially of 6–24% of $TiO_2$, 2–15% of $MgO$, 10–30% of $SiO_2$, 5–15% of Mn, 1–6% of $Al_2O_3$, 20–60% of iron powder, not more than 2.5% of iron oxide and 0.5–2.5% of an organic component and having a weight ratio of $MgO/(TiO_2+Al_2O_3)$ in the range of 0.15–0.7, and a binder for the flux.

4 Claims, 3 Drawing Figures

COATED ELECTRODE FOR ARC WELDING

BACKGROUND OF THE INVENTION

1. Field of the Invention

This invention relates to coated electrodes for arc welding, and more particularly to coated electrodes which provide a slag which has improved peeling characteristics.

2. Description of the Prior Art

In fillet welding, iron powder/iron oxide type electrodes (JIS-D4327) and special electrodes (JIS-D4340, D5000) which are intended specifically for fillet welding are generally used in order to insure stable welding operations. However, with these conventional electrodes, difficulties are encountered in removing sticking or biting slags in some cases where:

(1) there is a gap of a width greater than 3 mm;

(2) the work is coated with an anticorrosive shop primer in a thickness greater than 40 microns;

(3) an extraordinarily large current is applied; and (4) the rod manipulation rate is increased over 1.7. In addition, the bead shape and leg uniformity are deteriorated in certain cases, requiring reconditioning welding operations.

SUMMARY OF THE INVENTION

With the foregoing in view, the present invention has as its object the provision of a coated electrode in which the slag spontaneously peels off even under severe conditions. It is another object of the present invention to provide a coated electrode capable of forming a fillet bead which is satisfactory in both appearance and leg uniformity.

According to the present invention, there is provided a coated electrode comprising a flux consisting essentially of 6–24% of $TiO_2$, 2–15% of MgO, 10–30% of $SiO_2$, 5–15% of Mn, 1–6% of $Al_2O_3$, 20–60% of iron powder, not more than 2.5% of iron oxide and 0.5–2.5% of organic components and having a weight ratio of $MgO/(TiO_2+Al_2O_3)$ in the range of 0.15–0.7, said flux being admixed with a binder agent and coated on a core steel wire.

A coating of similar composition is disclosed in Applicant's copending Japanese Laid-open Patent Specification No. 50-96442, which, however, is directed to improvements in bead appearance, spattering and undercut and in which no consideration is given to the weight ratio or $MgO/(TiO_2+Al_2O_3)$ or to the improvement in the slag peeling characteristics. The present invention has succeeded in providing a coated electrode which is improved in these aspects.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
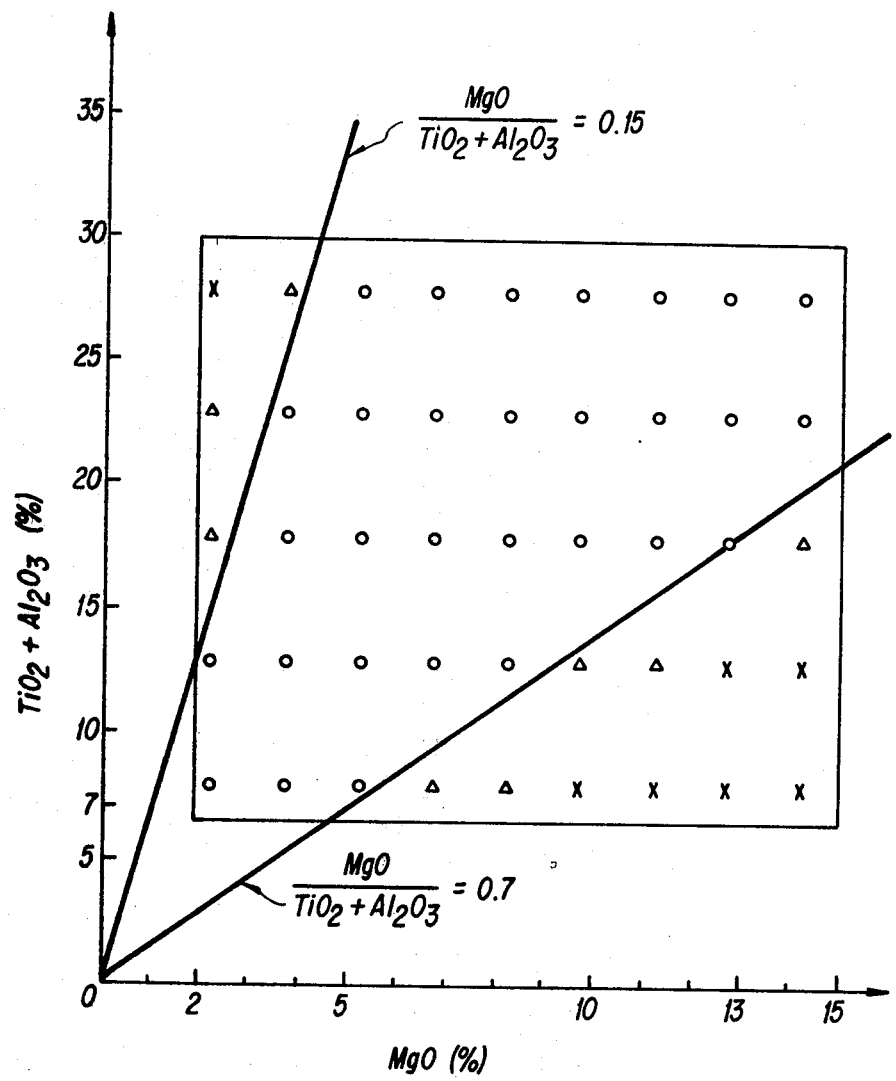
FIG. 1 is a diagram showing a suitable range of the ratio of $MgO/(TiO_2+Al_2O_3)$.

The above-defined ranges of the respective flux components and the ratio of $MgO/(TiO_2+Al_2O_3)$ are determined on the basis of the following considerations:

(1) $TiO_2$:6–24%

$TiO_2$ is incorporated for adjusting the peeling and enveloping characteristics and fluidity of the slag. If its content is less than 6%, undercut will easily occur. On the other hand, a $TiO_2$ content in excess of 24% will result in an excessively increased fluidity of the slag and irregular double bead.

(2) MgO:2–15%

MgO is a component which is used for adjusting the basicity and viscosity of the slag and has the effect of enhancing the slag peeling characteristics. However, an MgO content less than 2% will invite irregular bead formation due to high fluidity of the slag and lower the peeling characteristics of the slag. In contrast, its content over 15% will invite an excessively increased viscosity of the slag which lowers its enveloping or shielding characteristics, coupled with arc instability. Nevertheless, when the source of MgO is in a carbonate mineral such as magnesite or dolomite, its content is preferred to be not more than 5% since otherwise the re-arcing characteristics will be deteriorated and the arc itself will become coarse.

(3) $SiO_2$:10–30%

This component has the function of adjusting the viscosity of the slag and the intensity of the arc spray. With a $SiO_2$ content less than 10%, the intensity of the arc spray is very weak and the slag has a low viscosity, so that the bead is easily disturbed during the welding operation by contact with the fore end of the protective tube of the electrode. On the other hand, when $SiO_2$ is present in excess of 30%, the visocity of the slag is increased excessively and the arc spray becomes very strong, resulting in frequent undercut troubles and non-uniform bead appearance.

(4) Mn:5–15%

The component Mn, which is a deoxidizer, is effective for improving the welding quality. Its use in an amount less than 5% or in excess of 15% tends to cause insufficient or excessive deoxidization, respectively.

(5) $Al_2O_3$:1–6%

This component is effective in forming a spray arc and contributes to improve the slag peeling characteristics. An $Al_2O_3$ content less than 1% is insufficient to produce such an effect, while with a content over 6% the arc spray becomes coarse, causing undercut more frequently.

(6) Iron powder:20–60%

The iron powder which improves the welding efficiency and the re-arcing characteristics cannot produce these effects sufficiently if used in an amount less than 20%. However its use in excess of 60% will lower the insulating property of the covering and impair the safety of the welding operation.

(7) Iron oxide: not more than 2.5%

The iron oxide may be FeO or $Fe_2O_3$, which, even in a small amount, is effective for slag adjustment. In excess of 2.5%, the amount of the slag is increased, resulting in an irregular bead due to non-uniform covering. In addition, there is another drawback in that the slag tends to stick at the terminal end of the bead.

(8) Organic components:0.5–2.5%

The organic components act to stabilize the arc spray and improve the re-arcing characteristics. An organic content less than 0.5% is insufficient for producing these effects and, with an organic content in excess of 2.5%, the arc spray is excessively intensified, frequently causing undercut and spattering troubles.

(9) $MgO/(TiO_2+Al_2O_3)$:0.15–0.7

It is generally considered that the peeling characteristics of the slag are governed by the degree of thermal expansion and contraction of the slag and its density, and are greatly influenced by the content of MgO, $TiO_2$ and $Al_2O_3$. More particularly, MgO which makes the slag porous and easily breakable is an effective component for improving the detachability of the slag. However, in this instance, the detachment of the slag is facilitated only by application of impacts and there is a tendency for spontaneous peeling of the slag to become more difficult. As experienced with titanium type electrodes, $TiO_2$ forms a very fine and hard slag, and it is known to have good spontaneous peeling characteristics. However, under severe welding conditions as mentioned hereinbefore, it becomes extremely difficult to detach the slag due to the adverse effect of its fineness when strongly held in an undercut portion. $Al_2O_3$ acts similarly to $TiO_2$.

In view of the contrary influences of the three components on the detachability of the slag, it was considered that the respective influences might be synergistically and jointly utilized by varying their blending ratios, more particularly, by varying the ratio of $MgO/(TiO_2+Al_2O_3)$. This concept was tested by welding operations using various types of electrodes under the following conditions.

| | |
|---|---|
| Electrode | 5 mm$\phi$ × 700 mm (45 types) |
| Welding current | 230 A |
| Rod manipulating rate | 1.5 |
| Base metal | Mild steel coated with zinc-rich primer to a thickness of about 40$\mu$. Two 12 mm × 100 mm × 1000 mm plates forming a fillet welding T-joint with a gap of 3 mm |

The spontaneous detachability or peeling was classified in three ranks, "good" (O), "mediocre" (Δ) and "no good" (x), with results as shown in FIG. 1. More particularly, it has been found that, unless the weight ratio of $MgO/(TiO_2+Al_2O_3)$ is in the range of 0.15 to 0.7, no improvement can be expected in the spontaneous detachability of the slag even if the three components MgO, $TiO_2$ and $Al_2O_3$ are in the above-defined respective ranges.

The foregoing conditions (1) to (9) have been determined in this manner. In order to improve the adaptability of the electrode to actual welding applications, further consideration was given to the following points.

A coated electrode which satisfies the conditions (1) to (9) may be frequently used under conditions involving an extraordinarily large current. Therefore, it is desirable to provide some measures for preventing rod burning, a condition which occurs due to application of a large current during a welding operation.

Although hydrous minerals are generally known as a component which prevents rod burning, they have been found to be particularly effective in large current welding. Application of a large current causes a considerable temperature rise in the rear half of the electrode, decomposing the components of the coating and thus preventing normal welding operation. The water content in a hydrous mineral is remarkably effective in preventing an abrupt temperature rise of the electrode. For this purpose, not less than 4% of a hydrous mineral should be blended in, since it will be difficult to secure the above-mentioned effect with a hydrous mineral content less than 4%. However, in excess of 15%, the arc becomes coarse and spattering loss increases in addition to deterioration of bead shape. Thus, the upper limit of the hydrous mineral content should be put at 15%. Examples of useful hydrous minerals include coricite, talc, bentonite, kaolin, montmorillonite and the like.

The fluoride is limited to not more than 0.5% since its deliberate inclusion or its presence as impurities in excess of 0.5% will produce pits by vigorous reaction with the moisture content in the hydrous mineral. Therefore, the amount of fluoride added should be small enough to avoid this problem.

Figure 2:
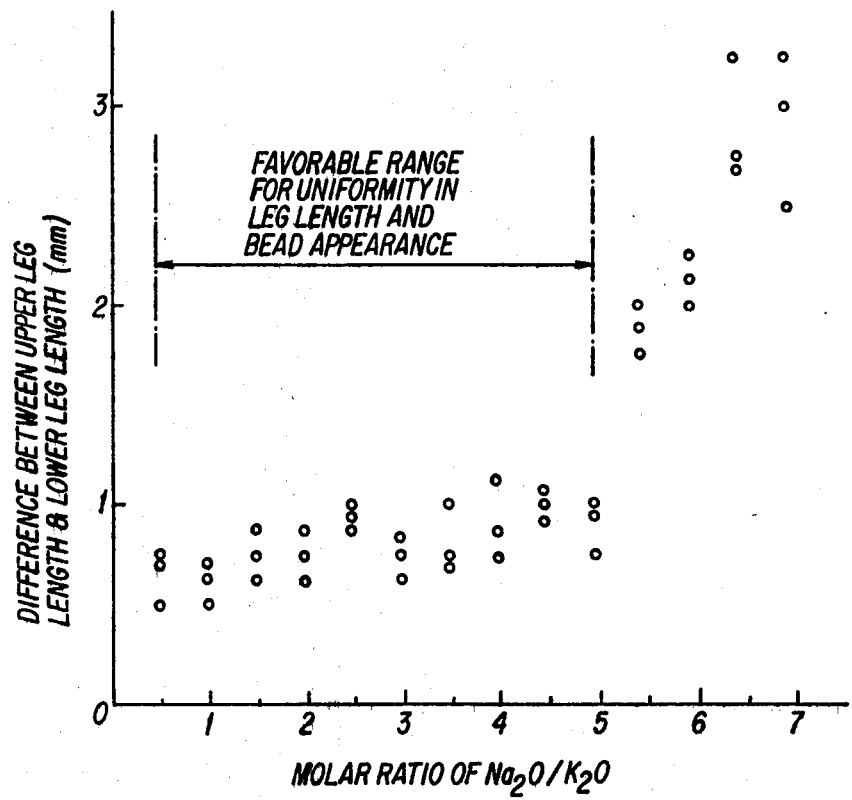
FIG. 2 is a diagram showing a suitable range of the molar ratio of $Na_2O/K_2O$.

With regard to the improvement of the bead shape, particularly, the uniformity in leg length, it has been found that satisfactory results can be obtained even under severe conditions by using for the binder water glass in which the molar ratio of $Na_2O/K_2O$ is in the range of 0.5 to 5. In this connection, it is generally known that the $Na_2O$ and $K_2O$ of water glass have a great influence on the strength and spray angle of the arc. Specifically, $Na_2O$) strengthens the arc while $K_2O$ weakens same. On the other hand, the bead shape and uniformity in leg length in fillet welding are largely influenced by the intensity of the arc spray, forming a concave bead when the arc is spread to an excessive degree and forming a convex bead when the arc is spread to a small extent. As for the criterion for the uniformity in leg lengths in fillet welding, it is the general practice to give a rating of "good" when the difference in length between the upper and lower logo is 1 mm or less. Therefore, in preparing the sample electrodes for the fillet welding tests, the molar ratio of $Na_2O/K_2O$ of water glass to be blended into the coating composition was varied from one to another. Each test bead was measured at three different points, whereby mean values of the upper and lower leg lengths were obtained to check for any difference therebetween. The results are shown in FIG. 2. As seen therefrom, it is possible to hold the difference in leg length to 1 mm or less when the molar ratio of $Na_2/K_2O$ is smaller than 5. If the molar ratio exceeds 5, there is observed a tendency toward non-uniform leg lengths and formation of a concave bead due to an insufficient thickness at the throat. On the other hand, when the above-mentioned molar ratio is smaller than 0.5, it is possible to maintain uniformity in leg length but the bead becomes convex and undercut is very probable.

Figure 3:
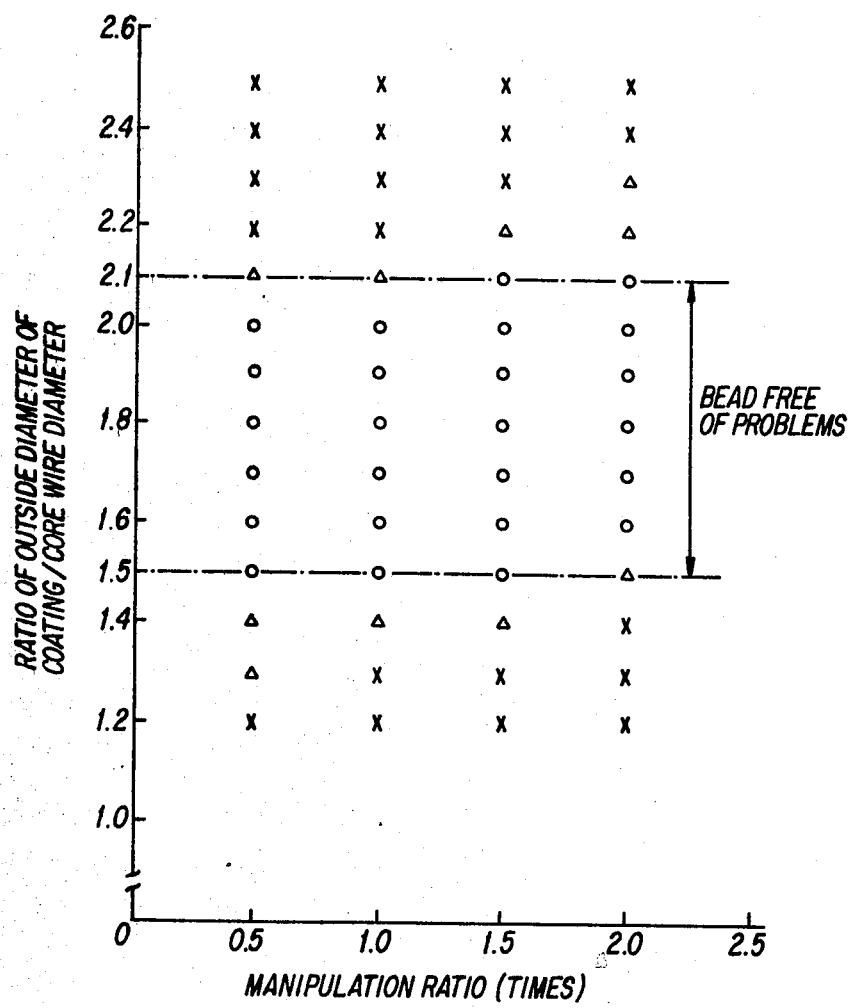
FIG. 3 is a diagram showing an allowable range of the rod manipulation rate.

Finally, our researches were directed to the enlargement of the allowable ranges of the rod manipulating rate. Generally, in order to enhance the rod manipulating rate, the slag production is increased to stabilize the operation. However, if the rate of rod manipulation is lowered while the slag is still being produced in a large amount, the slag gets in the way of the fore end of the protective tube, lending itself to the formation of a double bead. On the contrary, if the amount of slag is reduced for the purpose of enhancing the performance quality at a low rod manipulation rate, the bead tends to become convex when the manipulation rate is increased, provoking undercut. Therefore, our studies were carried on in search of the conditions in which the operability and bead shape are not influenced by large changes in the rod manipulating rate. More particularly, sample electrodes of various coating diameters were prepared without changing the flux composition and tested in fillet welding under the same conditions as mentioned hereinbefore. The results are shown in FIG. 3 in which the ratings of bead condition are indicated by the following symbols.

O: Reconditioning unnecessary
Δ: Reconditioning probable
X: Reconditioning required As seen in FIG. 3, a bead free of problems is obtained where the ratio of coating diameter/core wire diameter is in the range of 1.5 to 2.1. Outside this range, the allowable range of the manipulation ratio seems to be extremely narrow.

As described hereinbefore, the coated electrode according to the present invention is essentially improved in the spontaneous detachability of the slag and achieves the prevention of rod burning, improvement of the bead shape, especially, the uniformity of leg lengths and broadening of the allowable range of the rod manipulating rate. It is thus very suitable for use in practical welding operations.

Having generally described the invention, a more complete understanding can be obtained by reference to certain specific examples, which are provided herein for purposes of illustration only and are not intended to be limiting unless otherwise specified.

EXAMPLE

Sample electrodes of the compositions and dimensions shown in Table 1 were prepared.

TABLE 1

| | | $TiO_2$ | MgO | $Al_2O_3$ | Mn | $SiO_2$ | Organic Component | Iron Powder | FeO + $Fe_2O_3$ | Fluoride | Others | MgO/($TiO_2$ + $Al_2O_3$) |
|---|---|---|---|---|---|---|---|---|---|---|---|---|
| Comparative Examples | A-1 | 6.5 | 14.2 | 1.5 | 10.2 | 25.0 | 2.2 | 38.9 | 0.5 | 0.10 | 1.30 | 1.77 |
| | A-2 | 20.5 | 2.3 | 6.0 | 8.2 | 14.0 | 0.6 | 44.4 | 1.9 | — | 2.10 | 0.08 |
| | A-3 | 10.2 | 11.2 | 2.8 | 6.0 | 10.1 | 1.2 | 54.5 | 2.4 | 0.15 | 1.45 | 0.86 |
| | A-4 | 7.0 | 9.8 | 3.4 | 14.5 | 22.5 | 2.4 | 37.5 | 0.7 | — | 2.20 | 0.94 |
| Invention | B-1 | 18.8 | 3.5 | 1.2 | 5.2 | 19.5 | 1.1 | 48.5 | 0.1 | 0.10 | 2.00 | 0.17 |
| | B-2 | 23.7 | 14.0 | 5.8 | 14.7 | 10.2 | 1.8 | 26.0 | 2.3 | 0.48 | 1.02 | 0.47 |
| | B-3 | 10.2 | 2.2 | 2.8 | 6.5 | 19.4 | 1.5 | 55.0 | 0.3 | — | 1.60 | 0.16 |
| | B-4 | 6.2 | 3.8 | 1.8 | 13.5 | 12.3 | 2.3 | 58.0 | 0.2 | 0.40 | 1.50 | 0.47 |
| | B-5 | 23.9 | 6.0 | 5.6 | 8.5 | 29.8 | 0.7 | 23.0 | 0.9 | — | 1.60 | 0.20 |
| | B-6 | 20.8 | 8.2 | 2.2 | 12.2 | 25.3 | 2.4 | 27.0 | 0.5 | — | 1.40 | 0.35 |
| | B-7 | 12.1 | 10.2 | 3.1 | 14.0 | 23.2 | 1.4 | 34.0 | 0.6 | 0.14 | 1.26 | 0.67 |
| | B-8 | 17.2 | 14.8 | 4.6 | 6.3 | 15.0 | 0.9 | 38.0 | 1.6 | 0.25 | 1.35 | 0.67 |
| | B-9 | 23.0 | 11.3 | 4.5 | 6.5 | 11.0 | 1.9 | 37.5 | 2.1 | — | 2.20 | 0.41 |
| | B-10 | 14.5 | 7.0 | 1.5 | 11.5 | 12.0 | 1.6 | 48.0 | 2.4 | 0.13 | 1.37 | 0.43 |
| Comparative Examples | A-5 | 5.8 | 6.0 | 0.8 | 7.5 | 14.5 | 1.1 | 60.0 | 3.0 | — | 1.30 | 0.90 |
| | A-6 | 11.8 | 2.0 | 6.4 | 11.5 | 33.0 | 2.1 | 30.0 | 1.5 | 0.10 | 1.60 | 0.10 |
| | A-7 | 20.5 | 15.2 | 5.5 | 9.5 | 15.5 | 2.7 | 26.5 | 2.5 | — | 2.10 | 0.58 |
| | A-8 | 24.2 | 5.0 | 5.2 | 10.5 | 8.5 | 2.4 | 38.5 | 2.9 | 1.20 | 1.60 | 0.17 |
| | A-9 | 17.5 | 7.0 | 2.2 | 4.8 | 11.8 | 4.0 | 50.0 | 0.2 | 0.40 | 2.10 | 0.35 |
| | A-10 | 6.5 | 2.5 | 1.5 | 8.0 | 10.5 | 0.8 | 67.0 | 0.5 | 0.40 | 2.30 | 0.31 |
| | A-11 | 27.0 | 2.0 | 5.5 | 15.9 | 12.5 | 1.4 | 34.0 | 0.2 | — | 1.50 | 0.08 |
| | A-12 | 10.5 | 17.5 | 5.1 | 6.0 | 29.5 | 0.3 | 28.0 | 0.8 | 0.25 | 2.05 | 1.12 |
| | A-13 | 20.0 | 5.0 | 5.7 | 12.0 | 33.0 | 2.5 | 19.0 | 0.5 | 0.10 | 2.20 | 0.19 |

| | | Hydrous Mineral | Mol $Na_2O$* / Mol $K_2O$ | Coating diam. / Core diam | Rating of Performance Quality | | | | | |
|---|---|---|---|---|---|---|---|---|---|---|
| | | | | | Slag divestibility | Bead Shape | Leg uniformity | Range of rod manipulating rate | Red burn proofing | Overall rating |
| Comparative Examples | A-1 | 4.5 | 4.90 | 1.55 | X | O | O | O | O | X |
| | A-2 | — | 1.10 | 1.60 | X | O | O | O | Δ | X |
| | A-3 | 7.5 | 3.00 | 1.91 | X | O | O | O | O | X |
| | A-4 | — | 0.45 | 2.30 | X | O | O | Δ | Δ | X |
| Invention | B-1 | 3.2 | 0.65 | 2.12 | ⊙ | ⊙ | ⊙ | O | O | O |
| | B-2 | 14.8 | 0.95 | 1.80 | ⊙ | ⊙ | ⊙ | ⊙ | ⊙ | ⊙ |
| | B-3 | — | 4.80 | 1.55 | ⊙ | ⊙ | ⊙ | O | O | O |
| | B-4 | 4.5 | 6.50 | 1.90 | ⊙ | O | O | ⊙ | ⊙ | ⊙ |
| | B-5 | — | 0.55 | 2.00 | ⊙ | ⊙ | ⊙ | ⊙ | ⊙ | ⊙ |
| | B-6 | — | 2.25 | 2.15 | ⊙ | ⊙ | O | O | ⊙ | ⊙ |
| | B-7 | 12.0 | 7.50 | 1.48 | ⊙ | O | O | O | ⊙ | O |
| | B-8 | 4.20 / 13.5 | 1.72 | | ⊙ | ⊙ | ⊙ | ⊙ | ⊙ | ⊙ |
| | B-9 | — | 9.15 | 2.11 | ⊙ | O | O | O | O | O |
| | B-10 | 5.0 | 3.10 | 1.85 | ⊙ | ⊙ | ⊙ | ⊙ | ⊙ | ⊙ |
| Comparative Examples | A-5 | — | 1.80 | 1.85 | X | Δ | O | O | Δ | X |
| | A-6 | 15.5 | 6.50 | 1.70 | X | Δ | Δ | O | O | X |
| | A-7 | — | 9.15 | 2.15 | X | Δ | O | Δ | Δ | X |
| | A-8 | 14.5 | 1.50 | 1.56 | X | Δ | Δ | O | Δ | X |
| | A-9 | 7.5 | 0.40 | 1.48 | X | X | O | Δ | O | X |
| | A-10 | 4.5 | 4.10 | 1.58 | X | O | O | X | X | X |
| | A-11 | — | 2.50 | 2.19 | X | Δ | O | X | Δ | X |
| | A-12 | 3.8 | 0.88 | 1.60 | X | Δ | Δ | O | X | X |
| | A-13 | 13.5 | 3.31 | 1.80 | X | O | Δ | Δ | O | X |

*Water glass with a solute concentration of 35-45% and a specific gravity of 1.35-1.55 was added at a rate of 9-15 ml per 100 g of flux to serve as a binder.

The respective sample electrodes were used in the welding tests under the following conditions to examine their performance quality, with the results as shown in Table 1. The ratings are indicated by the following symbols.

| | |
|---|---|
| ⊚ | Very good (spontaneous slag peeling) |
| ○ | Good |
| Δ | Slightly inferior |
| X | Inferior |
| Welding Conditions | |
| Electrode | 5 mmφ × 700 mm |
| Welding current | 250 A |
| Rod manipulating rate | 1.8 |
| Base metal | Mild steel Coated with zinc-rich primer to a thickness of about 40μ Two 12 mm × 100 mm × 1000 mm flat plates forming a fillet welding T-joint with a gap of 3 mm |

In Table 1, (B-1) to (B-10) are examples of the present invention while (A-1) to (A-13) are comparative examples.

The examples (A-1) to (A-4) satisfy the aforementioned conditions (1) to (8) but not the condition of $MgO/(TiO_2+Al_2O_3)$, so that they fail to achieve spontaneous slag peeling.

The example (A-5) which is insufficient in $TiO_2$ and $Al_2O_3$ content is low in enveloping characteristics of the slag and susceptible to undercut. In addition, the covering of the slag becomes all the more uneven due to a large iron oxide content, failing to form a satisfactory bead.

The arc spray is too strong in the example (A-6) which contains $SiO_2$ and $Al_2O_3$ excessively. Consequently, spattering occurs to an increased degree, resulting in non-uniform enveloping characteristics of the slag and an irregular bead shape.

The arc is too strong in the example (A-7) with large MgO and organic contents, and undercut takes place.

The $TiO_2$ and iron oxide contents are excessive in the example (A-8) in contrast to the insufficient $SiO_2$ content. Therefore, the arc is weak and the protective tube of the electrode disturbs the shape of the bead by contact therewith.

The example (A-9) with an excessive organic content is too strong in arc spray intensity so that undercut occurs very easily. In addition, it is difficult to prevent formation of pits due to an insufficient Mn content.

The example (A-10) with a large iron powder content is inferior in the insulating characteristics of the coating, with increased possibility of dangerous accidents during the welding operation.

In the example (A-11) with an excessive Mn content, pits are produced by accelerated deoxidization and the bead has an inferior appearance.

The example (A-12) with a large MgO content exhibits uneven enveloping characteristics of the slag. Further, a satisfactory bead cannot be obtained due to an insufficient organic content.

The example (A-13) is insufficient in the iron powder content and excessive in $SiO_2$ content so that it has poor re-arcing characteristics.

Having now fully described the invention, it will be apparent to one of ordinary skill in the art that many changes and modifications can be made thereto without departing from the spirit or scope of the invention as set forth herein.

What is claimed is:

1. A coated electrode for arc welding, comprising a steel wire core and a flux coating thereon, said flux consisting essentially of 6-24% of $TiO_2$, 2-15% of MgO, 10-30% of $SiO_2$, 5-15% of Mn, 1-6% of $Al_2O_3$, 20-60% of iron powder, less than 2.5% of iron oxide and 0.5-2.5% of organic component and having a weight ratio of $MgO/(TiO_2+Al_2O_3)$ in the range of 0.15-0.7, and a binder for said flux.

2. The coated electrode of claim 1, wherein said flux further contains 4-15% of a hydrous mineral and less than 0.5% of fluoride.

3. The coated electrode of claim 1 or 2, wherein said binder is water glass having a molar ratio of $Na_2O/K_2O$ in the range of 0.5-5.

4. The coated electrode of claim 1, 2 or 3 wherein the ratio of the total diameter of said coated electrode to said steel wire core is in the range of 1.5 to 2.1.

* * * * *